United States Patent
Fogh et al.

[19]

[11] Patent Number: 6,138,465
[45] Date of Patent: Oct. 31, 2000

[54] METHOD FOR CONTROLLING THE TEMPERATURE OF A REFRIGERATION UNIT AND TEMPERATURE CONTROL ARRANGEMENT FOR A REFRIGERATION UNIT

[75] Inventors: Hans Erik Fogh; Hans Christiansen, both of Sønderborg, Denmark

[73] Assignee: Danfoss A/S, Nordborg, Denmark

[21] Appl. No.: 09/339,424

[22] Filed: Jun. 24, 1999

[30] Foreign Application Priority Data

Jun. 24, 1998 [DE] Germany ............... 198 28 061

[51] Int. Cl.$^7$ ................................ G05D 23/32
[52] U.S. Cl. .................. 62/157; 62/227; 62/441; 62/229
[58] Field of Search ............... 62/157, 227, 229, 62/213, 208, 228.1, 441, 443, 445, 524, 526

[56] References Cited

U.S. PATENT DOCUMENTS

| | | | |
|---|---|---|---|
| 4,481,787 | 11/1984 | Lynch | 62/180 |
| 5,524,444 | 6/1996 | Gromala et al. | 62/115 |
| 5,535,597 | 7/1996 | An | 62/126 |
| 5,992,163 | 11/1999 | Baruschke et al. | 62/156 |

*Primary Examiner*—Corrine McDermott
*Assistant Examiner*—Marc Norman
*Attorney, Agent, or Firm*—Lee, Mann, Smith, McWilliams, Sweeney & Ohlson

[57] ABSTRACT

The invention concerns a method for controlling the temperature of a refrigeration unit (1) with a refrigerating compartment (3), a freezing compartment (2) and a common evaporator (4) of a cooling circuit, and a corresponding temperature control arrangement. In a first mode (normal operation) the compressor (5) of the cooling circuit is turned ON when cooling is required and turned OFF when cooling is not required, in dependence of the refrigerating compartment temperature ($T_2$). In a second mode, in spite of no cooling requirement in the refrigerating compartment (3), the compressor (5) is forced ON for a predetermined operating time ($t_1$), when the OFF-time of the compressor has exceeded a threshold value ($t_2$). The forced turning ON is repeated as often as the OFF-time exceeds the threshold value. A return to the first mode occurs as soon as the refrigerating compartment (3) requires cooling. The temperature control arrangement involved has a monitoring arrangement (14) for the duration of the OFF-time, a threshold value transmitter (16) and a comparator (15), which, in case the OFF-time is exceeded provides an excess signal. An ON-timer (19) transmits an ON-signal specified for a certain duration to the switching device (8). Thus the cooling need of freezing compartment (2) and refrigerating compartment (3) can be satisfied within a wide range of ambient temperatures, and additionally a frost protection of the refrigerating compartment and a safe defrosting of the evaporator can be provided.

7 Claims, 2 Drawing Sheets

METHOD FOR CONTROLLING THE TEMPERATURE OF A REFRIGERATION UNIT AND TEMPERATURE CONTROL ARRANGEMENT FOR A REFRIGERATION UNIT

BACKGROUND AND SUMMARY OF THE INVENTION

The invention concerns a method for controlling the temperature of a refrigeration unit having a refrigerating compartment, a freezing compartment and a common evaporator of a cooling circuit, in which in a first mode (normal operation) the compressor of the cooling circuit is turned ON when cooling is required and turned OFF when cooling is not required, in dependence of the refrigerating compartment temperature, and a temperature control arrangement for a refrigeration unit with a refrigerating compartment having a refrigerating compartment temperature sensor, a freezing compartment, a common evaporator of a cooling circuit and a switch device, which in a first mode (normal operation) turns the compressor of the cooling circuit ON when cooling is required and OFF when cooling is not required, in dependence of the refrigerating compartment temperature.

Refrigeration units, in which the refrigerating compartment and the freezing compartment are cooled by a common evaporator, are normally dimensioned so that with normal operating conditions, for example with an ambient temperature of 25° C. and a medium setting of the desired refrigerating compartment temperature of about 5° C., a freezing compartment temperature of −18° C. is obtained. Difficulties occur, when the ambient temperature decreases relative to the desired refrigerating compartment temperature set by the user. It is a fact that the cooling requirement of the refrigerating and freezing compartments decreases with decreasing ambient temperature; as, however, the cooling requirement of the refrigerating compartment decreases faster than that of the freezing compartment, it may happen that the cooling requirement of the refrigerating compartment is covered, whereas there is still a cooling requirement in the freezing compartment. As the cooling requirement of the refrigerating compartment is only small, the compressor is only turned on infrequently. This causes an inadmissible rise in the freezing compartment temperature. In the extreme case, when the ambient temperature is equal to or lower than the desired refrigerating compartment temperature, the compressor is not turned on at all, and the temperature of the freezing compartment will increase towards 5° C. until a cooling requirement occurs in the refrigerating compartment again. This means that the freezing compartment temperature increases inadmissibly and that the freezing compartment temperature is dependent on the cooling requirement in the refrigerating compartment.

To solve the problem described, it is known (DE 196 48 399 A1) to provide a lamp or another heat source in the refrigerating compartment, which artificially increases the cooling requirement of the refrigerating compartment. This indeed leads to an earlier turning on of the compressor, but it also causes a higher energy consumption.

A solution involving control techniques is described in U.S. Pat. No. 5,524,444. Ex works an electronic table is prepared for each particular refrigerator unit, which table comprises ON-times in dependence of the ambient temperature for a certain desired refrigerating compartment temperature. These tables are calculated by the producer by means of tests, and comprise the ON-times of a compressor belonging to certain ambient temperatures. An electronic monitoring arrangement measures the ON-time of the compressor and calculates a medium value over three ON-times. This medium value is used as input value in the table and supplies information about the ambient temperature (calculated by means of tests) and the optimum ON-time of the compressor for maintaining the desired freezing compartment temperature. As the optimum ON-times for the freezing compartment and the refrigerating compartment are different, a compensation period is started to reduce the temperature in the freezing compartment.

From U.S. Pat. No. 5,535,597 it is known to forcedly turn on a compressor of a cooling circuit for predetermined times, when a temperature sensor is defective.

The task of the invention is to provide a method and a temperature control arrangement as described in the introduction ensuring in a simple way that the cooling requirements of both freezing compartment and refrigerating compartment are covered within a larger range of the ambient temperature.

With regard to the inventive method, this task is solved in that in a second mode, in spite of no cooling requirement in the refrigerating compartment, the compressor is forced ON for a predetermined operating time, when the OFF-time of the compressor has exceeded a threshold value, that the forced turning ON is repeated as often as the OFF-time exceeds the threshold value, and that a return to the first mode occurs as soon as the refrigerating compartment requires cooling.

With this method, the duration of the OFF-time is used for determining the cooling requirement in the freezing compartment, and the compressor is turned on accordingly once or several times for a predetermined operating period. Surprisingly, this measure permits the cooling requirement of the freezing compartment to be covered in a simple way, independently of the ambient temperature.

It is advantageous that in the second mode the compressor is turned OFF before reaching the end of the predetermined operating period, when the refrigeration compartment temperature goes below a safety value fixed to be somewhat over the freezing point. This ensures in a reliable way that the refrigerating compartment remains frost-free and that the articles stored in it are not damaged.

Further, it is recommended that the threshold value of the OFF-time is so high that the evaporator is defrosted. Thus, the evaporator is completely de-iced. This can be obtained in that the threshold value is found empirically and fixedly stored.

In a preferred embodiment the threshold value of the OFF-time is determined by the evaporator temperature rising to a value lying above the dew-point. Thus, it is ensured that the evaporator is completely defrosted, and, on the other hand, that the temperatures in the compartments do not increase unnecessarily.

With regard to the control arrangement, the task is solved according to the invention in that a monitoring arrangement measures the duration of the OFF-time, that a threshold value transmitter is provided, specifying a threshold value for the OFF-time, that a comparator compares the duration of the OFF-time with the threshold value during the OFF-time and, in case it is exceeded, emits an excess signal, that an ON-timer is provided, specifying an ON-time, and that in a second mode the switching device turns ON the compressor on the occurrence of an exceess signal and turns it OFF again at the end of the predetermined ON-time. This gives a relatively simple arrangement with which the method according to the invention can be carried through.

It is recommended that an overriding device is provided, which reduces the ON-time to a value, at which the refrigerating compartment sensor measures a temperature, which is slightly above the freezing point. Thus, the compressor can be turned OFF, when there is a risk of frost in the refrigerating compartment.

Further, it is advantageous that an evaporator temperature sensor and an overriding device are provided, which reduce the OFF-time to a value, at which the evaporator temperature sensor measures a temperature, which is slightly above the dew-point. This again provides a proper de-icing of the evaporator without causing an unwanted temperature increase in the refrigerating compartment and the freezing compartment.

BRIEF OF DESCRIPTION OF THE DRAWINGS

In the following the invention is described on the basis of a preferred embodiment in connection with the drawings, showing:

FIG. 1 a schematic view of a temperature control arrangement according to the invention FIG. 2 a diagram of the course of the ambient temperature, the evaporator temperature, the refrigerating compartment temperature and the freezing compartment temperature.

DETAILED DESCRIPTION

Figure 1:
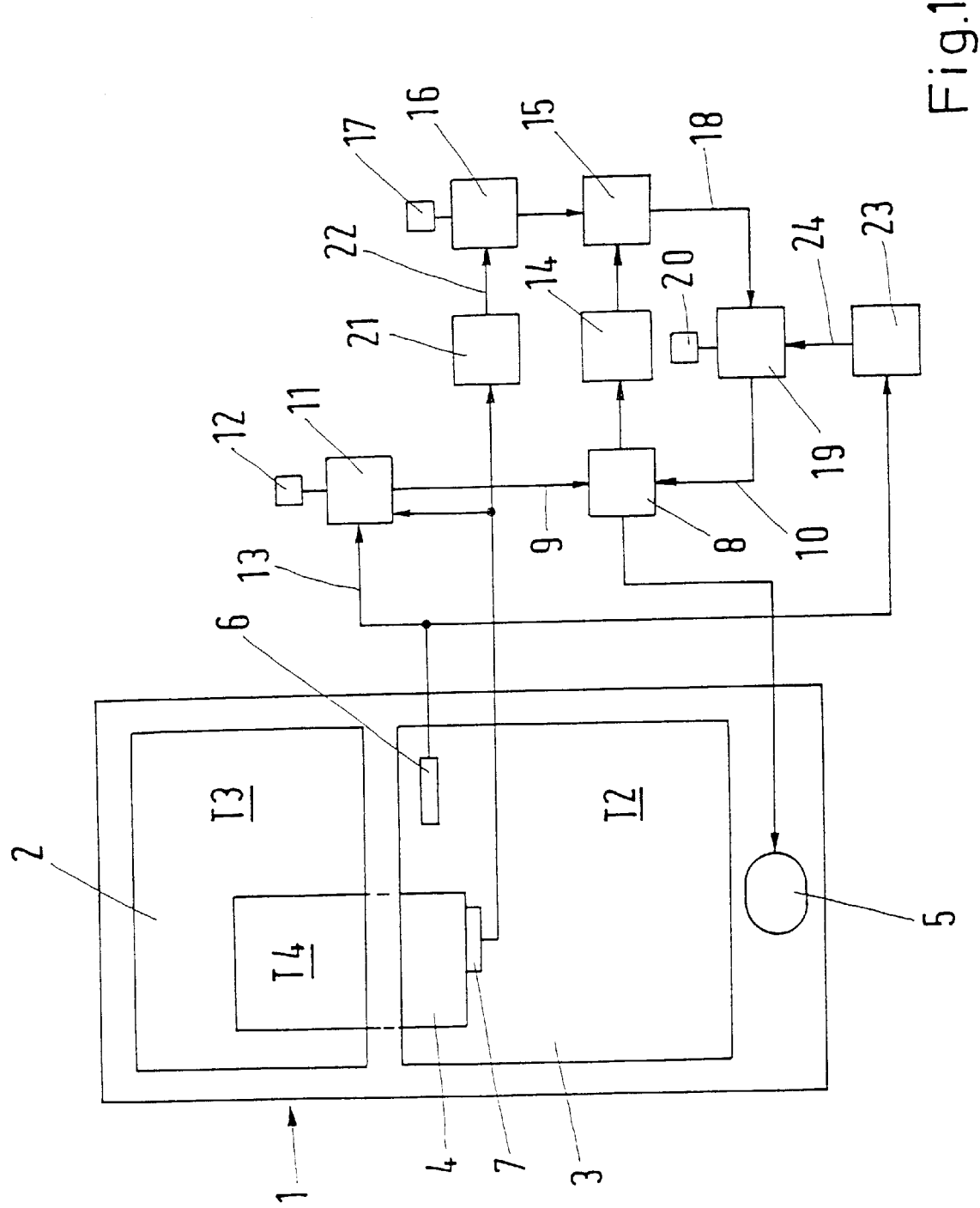

FIG. 1 shows a refrigerator unit with a freezing compartment 2 and a refrigerating compartment 3. A common evaporator 4 is trimmed to be arranged in both compartments in a way that the cooling requirements of both freezing compartment 2 and refrigerating compartment 3 are approximately satisfied. The evaporator 4 is part of a cooling circuit (not shown in detail) also comprising a compressor 5. Additionally, a refrigerating compartment temperature sensor 6 and an evaporator temperature sensor 7 are arranged in the refrigerating compartment 3.

The compressor 5 is turned on and off via a switching device 8 having a first input 9 for a first mode and a second input 10 for a second mode.

In the first mode a temperature controller 11 is effective, for example in the form of a thermostat causing an on-off control, the thermostat receiving via a setting device 12 the desired value of the refrigerating compartment temperature and from the refrigerating compartment temperature sensor 6 via the input 13 the actual value. If the actual value exceeds an upper limit of the desired value, the compressor 5 is turned ON. Also the evaporator temperature sensor 7 is connected with the temperature controller 11 to ensure a de-icing of the evaporator in this mode.

In a second mode it is provided that a monitoring arrangement 14 determines the duration of the OFF-time since the last turning OFF of the compressor 5. A comparator 15 compares this duration of the OFF-time with a threshold value specified by a threshold value transmitter 16 and adjustable through, for example, an adjustment device 17. When the threshold value is exceeded, an excess signal occurs on the output 18 of the comparator 15, which signal causes an ON-time transmitter 19 to transmit an ON switching signal via the input 10 to the switching device 8, the duration of which signal can be specified through an adjustment device 20. Then the compressor 5 operates for the duration of the specified ON-time.

The optimum value of the threshold value specified by the adjustment device 17 and the specified operating time specified by the adjustment device 20 can be found empirically and chosen so that the largest possible cooling is obtained in the freezing compartment 2 without causing frost in the refrigerating compartment 3, and so that a complete de-icing of the evaporator 4 is ensured. Typical values of the threshold value of the OFF-time are 1 to 2 hours, and for the ON-time 10 to 20 minutes.

An overriding device 21 is allocated to the threshold value transmitter 16, which overriding device transmits an END-signal via its output 22, when the evaporator temperature sensor 7 measures a value $T_t$ slightly above the dew-point, meaning that the evaporator 4 is completely de-iced. The END-signal interrupts the comparison procedure and immediately releases the excess signal on the output 18 of the comparator 15. The compressor 5 then immediately starts operating.

An additional overriding device 23 is allocated to the ON-timer 19. This device is activated and transmits via its output 24 an END-signal ending the ON-time specified by the ON-timer 19, when the refrigerating compartment temperature sensor 6 goes below a safety value $T_s$, which is slightly above the freezing point. This ensures that the refrigerating compartment remains frost-free and the temperature in the freezing compartment does not fall below −18° C.

Figure 2:
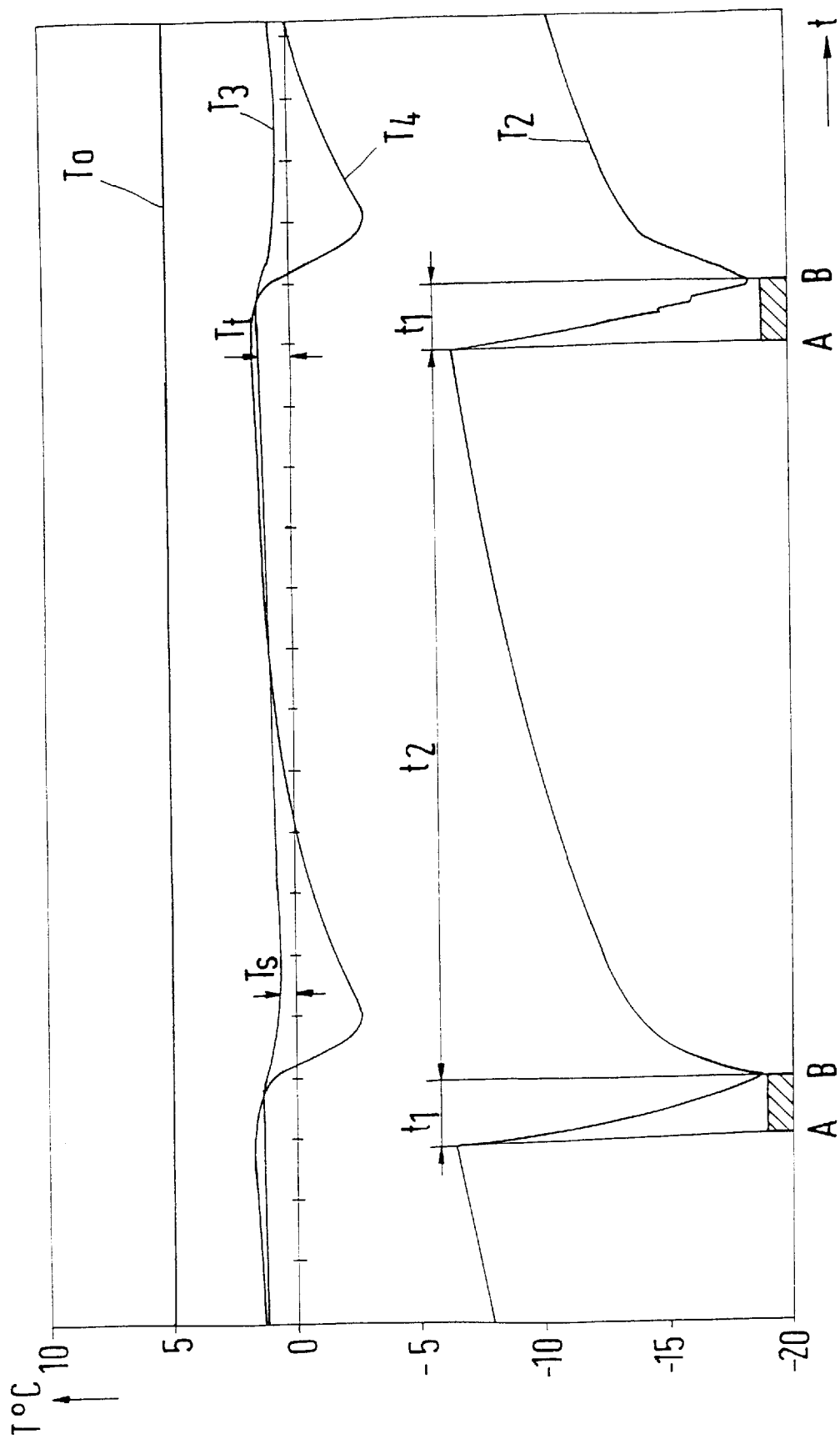

FIG. 2 shows the mode of operation of the temperature control arrangement in FIG. 1 in the second mode. Here a test is concerned, during which an ambient temperature $T_a$ of 5° C. was artificially maintained. Further, the freezing compartment temperature $T_2$, the refrigerating compartment temperature $T_3$ and the evaporator temperature $T_4$ are stated. Additionally, the hatched areas show the operating time $t_1$ of the compressor 5 and the threshold value $t_2$ of the OFF-time of the compressor.

It can be seen that at the time A the compressor is turned ON, when the OFF-time exceeds the threshold value $t_2$. The compressor then operates for a fixedly specified operating time $t_1$, and is turned OFF again at the time B. Accordingly, the evaporator temperature $T_4$ decreases with a certain time delay, and increases gradually again after turning OFF the compressor 5. The refrigerating compartment temperature $T_3$ only experiences a slight change above the freezing point at 0° C. The freezing compartment temperature $T_2$ which had risen to about −7° C. during the long standstill, falls to −18° C. and then again increases continuously. The threshold value $t_2$ is calculated so that at the time A the evaporator temperature $T_4$ has a value $T_t$ lying above the dew-point (0° C.), meaning that the evaporator 4 is completely de-iced.

By means of the overriding device 21 the evaporator temperature $T_4$ can also be used to reduce the threshold value $t_2$, thus preventing a too rapid increase in the evaporator temperature $T_4$. If the refrigerating compartment temperature $T_3$ should decrease below a safety value $T_s$, which only has to be about 1° C. above the freezing point, meaning that there is a risk of frost, this can be established by means of the refrigerating compartment sensor 6, and via the overriding device 21 be used to turn OFF or not turn ON the compressor. The simultaneous monitoring of refrigerating compartment temperature $T_3$ and evaporator temperature $T_4$ makes the system reach a high accuracy in keeping the freezing temperature $T_2$ within the desired range, preventing the refrigerating compartment temperature $T_3$ from falling below the freezing point and obtaining a regular defrosting of the evaporator.

As shown in FIG. 2, the operating steps in the second mode can be repeated, thus maintaining the desired temperatures in refrigerating compartment and freezing compartment.

The operating time $t_1$, which is fixedly set via the adjustment device 20, can also be variable, for example, it can be reduced in dependence on the refrigerating compartment temperature, which is measured continuously anyway. Also the threshold value $t_2$ of the OFF-time, which is fixedly set via the adjustment device 17, can be variable, for example, it can be reduced in dependence on the evaporator temperature $T_4$.

Of course, both refrigerating compartment and freezing compartment may comprise several parts. In this connection each of the partial refrigerating compartments may have their own temperature sensor.

What is claimed is:

1. Method for controlling the temperature of a refrigeration unit having a refrigerating compartment, a freezing compartment and a common evaporator of a cooling circuit, the method having first and second modes, the method comprising the steps of, in the first mode, and in dependence on the refrigerating compartment temperature, turning the compressor of the cooling circuit ON when cooling is required and OFF when cooling is not required, and in the second mode, in spite of no cooling requirement in the refrigerating compartment, forcing the compressor ON for a predetermined operating time when OFF-time of the compressor has exceeded a threshold value, repeating the forced turning ON of the compressor as often as the OFF-time exceeds the threshold value, and returning to the first mode as soon as the refrigerating compartment requires cooling.

2. Method according to claim 1, in which in the second mode the compressor is turned OFF before reaching the end of the predetermined operating time when the refrigeration compartment temperature goes below a safety value set to be somewhat over freezing.

3. Method according to claim 1, in which the threshold value of the OFF-time is sufficiently high that an the evaporator of the refrigeration unit is defrosted.

4. Method according to claim 3, in which the threshold value of the OFF-time is determined by time taken for the evaporator temperature to reach a value above the dew-point.

5. Temperature control arrangement for a refrigeration unit with a refrigerating compartment having a refrigerating compartment temperature sensor, a freezing compartment, a common evaporator of a cooling circuit and a switching device, which in a first mode, and in dependence on the refrigerating compartment temperature, turns the compressor of the cooling circuit ON when cooling is required and OFF when cooling is not required, the temperature control arrangement comprising a monitoring arrangement to sense the duration of the OFF-time of the compressor, a threshold value transmitter to specify a threshold value for the OFF-time, a comparator to compare the duration of the OFF-time with the threshold value and, in case it is exceeded, transmit an excess signal, an ON-timer to specify an ON-time, and the switching device having a second mode which turns ON the compressor on the occurrence of the excess signal and turns the compressor OFF again at the end of the predetermined ON-time.

6. Temperature control arrangement according to claim 5, including an overriding device which reduces the ON-time to a value at which the refrigerating compartment temperature sensor measures a temperature which is slightly above freezing.

7. Temperature control arrangement according to claim 5, including an evaporator temperature sensor and an overriding device connected to reduce the OFF-time to a value at which the evaporator temperature sensor measures a temperature which is slightly above the dew-point.

* * * * *